(12) United States Patent
Lee et al.

(10) Patent No.: US 10,487,871 B2
(45) Date of Patent: Nov. 26, 2019

(54) AIR FOIL JOURNAL BEARING

(71) Applicant: HANON SYSTEMS, Daejeon (KR)

(72) Inventors: Jong Sung Lee, Daejeon (KR); Gun Woong Park, Daejeon (KR); Chi Yong Park, Daejeon (KR); Hyun Sup Yang, Daejeon (KR); Kyu Sung Choi, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 0 days.

(21) Appl. No.: 16/165,217

(22) Filed: Oct. 19, 2018

(65) Prior Publication Data
US 2019/0154080 A1  May 23, 2019

(30) Foreign Application Priority Data

Nov. 21, 2017  (KR) .................. 10-2017-0155224

(51) Int. Cl.
*F16C 32/06*  (2006.01)
*F16C 17/02*  (2006.01)
*F16C 27/02*  (2006.01)

(52) U.S. Cl.
CPC ............ *F16C 17/024* (2013.01); *F16C 27/02* (2013.01); *F16C 2360/24* (2013.01)

(58) Field of Classification Search
CPC .... F16C 17/024; F16C 27/02; F16C 32/0677; F16C 2360/24
See application file for complete search history.

(56) References Cited

U.S. PATENT DOCUMENTS

| | | | | |
|---|---|---|---|---|
| 2002/0054718 A1* | 5/2002 | Weissert | ............... | F16C 17/024 384/104 |
| 2005/0163407 A1* | 7/2005 | Kang | .................... | F16C 17/024 384/106 |
| 2006/0018574 A1* | 1/2006 | Kang | .................... | F16C 17/024 384/106 |
| 2015/0362012 A1* | 12/2015 | Ermilov | ................ | F16C 17/024 384/105 |
| 2017/0089387 A1* | 3/2017 | Kim | ...................... | F16C 17/024 |

FOREIGN PATENT DOCUMENTS

KR  100749828 B1  8/2007

OTHER PUBLICATIONS

Lee, Jong Sung et al., "Analysis of Three-Pad Gas Foil Journal Bearing for Increasing Mechanical Preloads", J. Korean Soc. Tribol. Lubr. Eng., vol. 30, No. 1, Feb. 2014, pp. 1-8.

* cited by examiner

*Primary Examiner* — Phillip A Johnson
(74) *Attorney, Agent, or Firm* — Dickinson Wright PLLC (57) ABSTRACT

The present invention relates to an air foil journal bearing including a bearing housing having a hollow, in which a rotor is arranged, and a pair of top foils with different lengths formed inside the hollow, thereby enhancing assemblability since the lengths are reduced and increasing stability at the time of high speed rotation through position adjustment of a slot to which the top foils are inserted.

9 Claims, 8 Drawing Sheets

AIR FOIL JOURNAL BEARING

CROSS-REFERENCE TO RELATED APPLICATIONS

This application claims the benefit and priority of KR 10-2017-0155224 filed Nov. 21, 2017. The entire disclosure of the above application is incorporated herein by reference.

FIELD OF THE INVENTION

The present invention relates to an air foil journal bearing, and more particularly, to an air foil journal bearing, which includes a pair of top foils having different lengths, thereby enhancing stability at the time of high speed rotation.

BACKGROUND

A bearing is a mechanical element which fixes a rotary shaft at a predetermined position and supports self-weight of the shaft and load applied to the shaft to rotate the shaft.

An air foil bearing among bearings is a bearing supporting load when air, which is a fluid with viscosity between foils getting in contact with a rotor or a bearing disc according to high speed rotation of the rotor or a rotary shaft, is introduced and forms pressure.

Moreover, an air foil journal bearing among the air foil bearings is a bearing for supporting a radial-direction load of the rotor, which is a vertical direction to the rotor.

Figure 1:
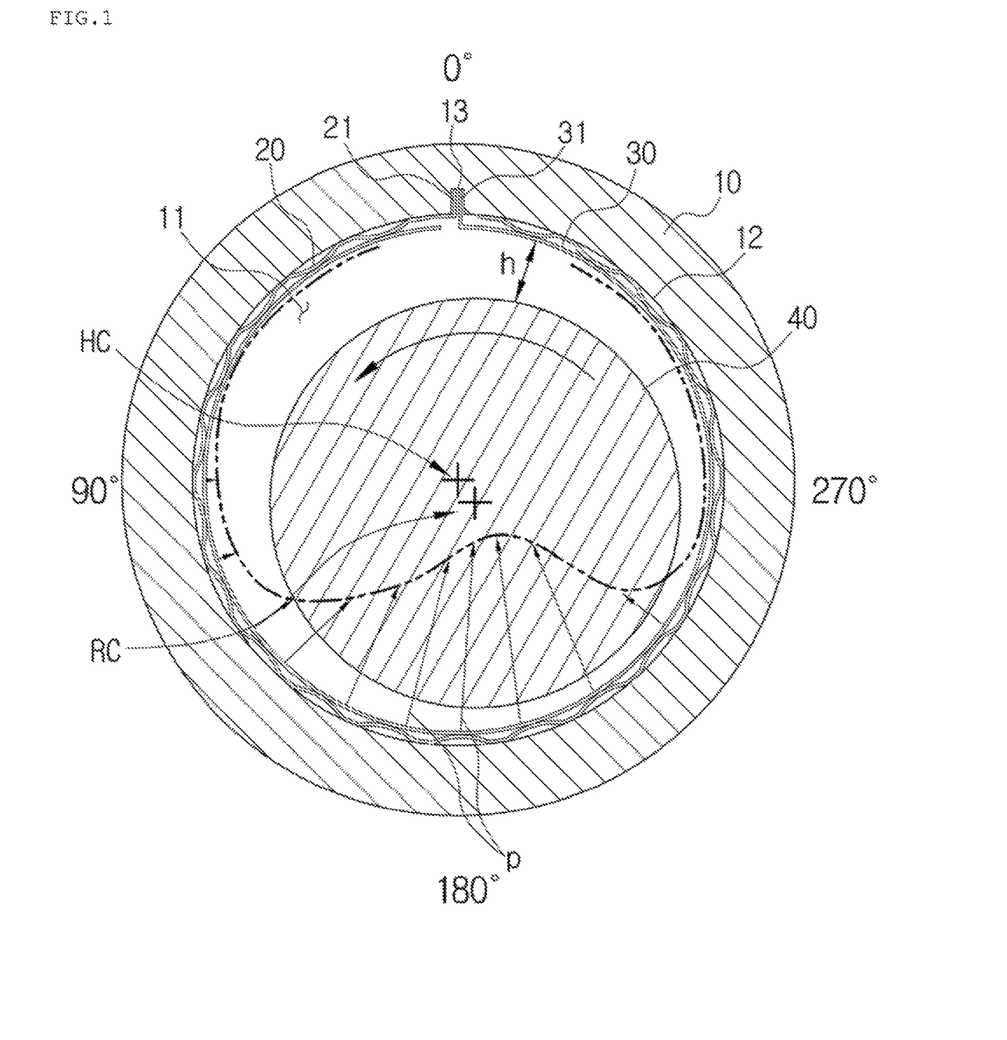
FIG. 1 is a sectional view showing pressure distribution of air when a conventional air foil journal bearing and a rotor are rotated.

FIG. 1 is a sectional view showing pressure distribution of air when a conventional air foil journal bearing and a rotor are rotated.

In this instance, as shown in FIG. 1, the air foil journal bearing includes a bearing housing 10, a bump foil 20 mounted along an inner circumferential surface 12 of a hollow 11 of the bearing housing 10, a top foil 30 arranged inside the bump foil 20, and a rotor 40 or a rotary shaft arranged inside the top foil 30, wherein the rotor 40 is rotated in a state that the inner circumferential surface of the top foil 30 and the outer circumferential surface of the rotor 40 are spaced apart from each other. Here, the bump foil 20 and the top foil 30 have bent portions 21 and 31 formed by end portions of a circumferential direction bent outwardly in the radial direction. The bent portions 21 and 31 are inserted into a slot 13 formed in the bearing housing 10 to be combined with the bearing housing 10, so that the bump foil 20 and the top foil 30 do not rotated or are not pushed out and are fixed to the bearing housing 10.

Figure 2:
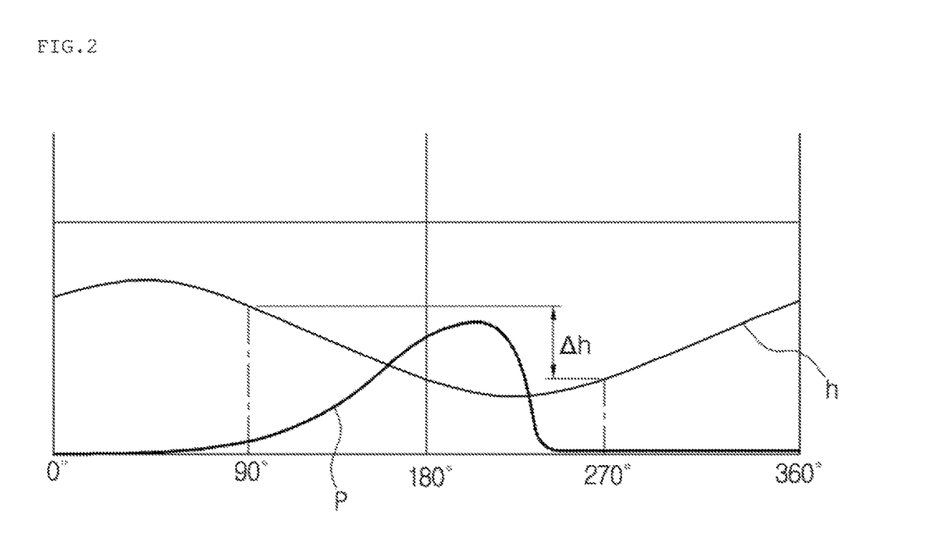
FIG. 2 is a graph showing an interval (h) between the top foil and the rotor and pressure distribution (p) of air according to a location or an angle of the bearing housing when the rotor in FIG. 1 is rotated.

FIG. 2 is a graph showing an interval (h) between the top foil and the rotor and pressure distribution (p) of air according to a location or an angle of the bearing housing when the rotor in FIG. 1 is rotated.

As shown in FIG. 2, when the rotor 40 is rotated, as shown in the drawing, pressure is formed by air existing between the top foil 30 and the rotor 40 so that the rotor 40 is rotated in a state that the rotor 40 is spaced apart from the top foil 30. That is, when the rotor 40 is stopped, a lower side of the rotor 40 is arranged on the top foil 30 by self-weight of the rotor 40 to be supported, and when the rotor is rotated, the rotor 40 is rotated in a floating state. In this instance, a rotational center of the rotor 40 does not coincide with the center of the bearing housing 10, and the rotor 40 rotates in a state that the rotational center of the rotor 40 is one-sided toward one side from a rotational center of the bearing housing 10. In more detail, the rotational center of the rotor 40 is located lower than the center of the bearing housing 10, and when the rotor 40 rotates in the counterclockwise direction, the rotational center of the rotor 40 is formed to be sided to the right.

As described above, when the rotational center of the rotor 40 does not coincide with the center of the bearing housing 10 and the rotor 40 rotates in the one-sided state, if it is used to an air compressor, a rotational accuracy of an impeller combined with one side of the rotor 40 to be rotated with the rotor 40 is deteriorated, so it may deteriorate efficiency and performance of the air compressor.

Figure 3:
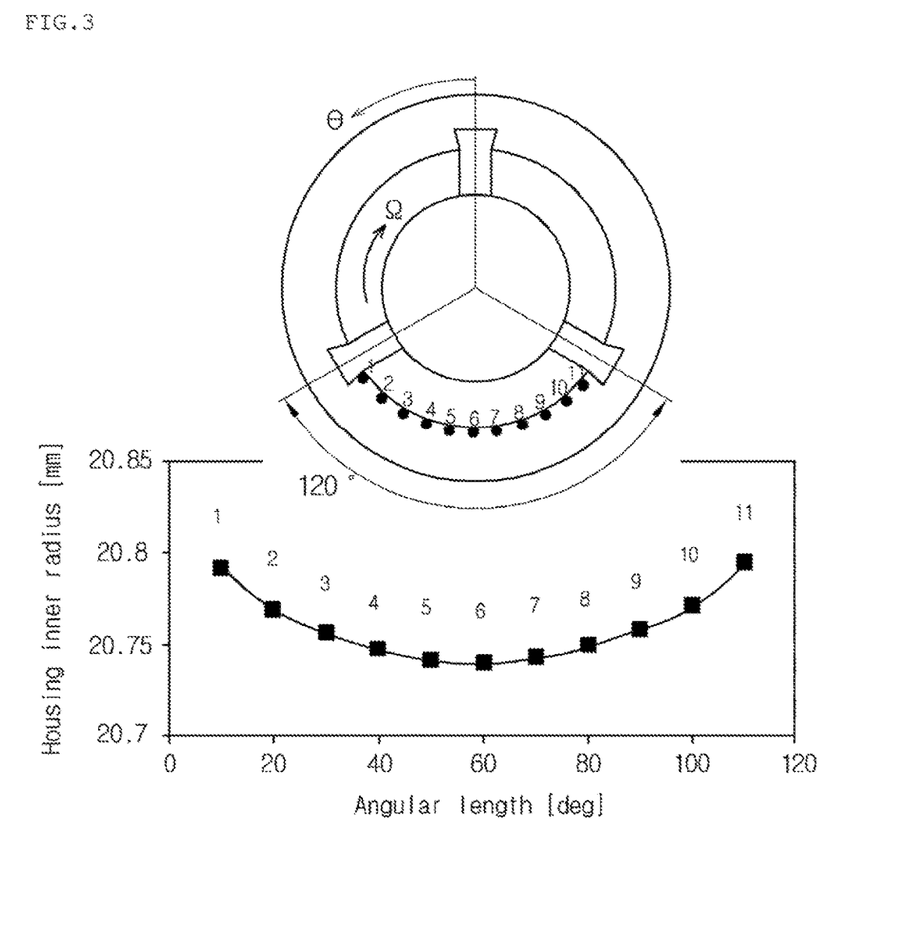
FIG. 3 is a relation diagram and a graph showing intervals among the bearing housing, the foil and the rotor to which three foils are applied (according to a non-patent literature number 001)

FIG. 3 is a relation diagram and a graph showing intervals among the bearing housing, the foil and the rotor to which three foils are applied (according to a non-patent literature number 001).

In order to solve the above-mentioned problem, as shown in FIG. 3, when the number of foils (top foils or bump foils) of a bearing is increased, because pressure generated by an inner flow is increased and different movements of three pads may increase rigidity and damping effect, it is technology to use three foils rather than one foil.

That is, three slots are formed in a bearing housing at intervals of 120 degrees and the foils are inserted into the slots to provide mechanical preload in order to enhance high speed stability of the rotor. Furthermore, such technology shows that a gas foil bearing having preload enhances high speed stability of oil-free turbocharger and is less friction loss than a bearing with reduced oil film clearance.

However, such technology can increase rigidity and damping effect through independent movement of the three pads and ascend pressure generated through the inner flow of a joining part. However, the conventional technology is difficult to inspect assembly tolerance and to do mass production if components of the bearing is more than necessary since three foils must be used.

Additionally, In FIG. 1, if a bump is assembled in a protruding state by a worker's mistake when one foil is assembled to the bearing, operation safety of the rotor is deteriorated, and severely, the bump digs into one side of the impeller of the opposite side and causes abrasion of the impeller. In addition, such an unstable movement causes a biased friction of the bearing and deteriorates durability.

As disclosed in Korean Patent No. 10-0749828 including a bearing to which one foil is applied, the bearing can fix a back-and-forth movement of a journal bearing using a stopper and serve as a seal by blocking an air gap between a top foil and a bearing housing. However, the conventional bearing is disadvantageous in cooling since heat generated by friction of a bump cannot get out, and it is difficult to promote mass production due to difficult management of tolerance between the inner diameter of the stopper and the outer diameter of a shaft since the bump is transformed by vibration of the shaft.

SUMMARY OF THE INVENTION

Accordingly, the present invention has been made to solve the above-mentioned problems occurring in the prior arts, and it is an object of the present invention to provide an air foil journal bearing including a bearing housing having a hollow, in which a rotor is arranged, and a pair of top foils with different lengths formed inside the hollow, thereby enhancing assemblability since the lengths are reduced and increasing stability at the time of high speed rotation through position adjustment of a slot to which the top foils are inserted.

To accomplish the above object, according to the present invention, there is provided an air foil journal bearing including: a pair of top foils formed inside a hollow of a bearing housing in which a rotor is arranged, wherein a pair of the top foils have different lengths.

Moreover, the top foils are a first top foil and a second top foil, which is shorter than the first top foil, and the bearing housing includes a pair of slots to which end portions of the top foils are inserted.

Furthermore, the slots are a first slot and a second slot, and the first top foil and the second top foil respectively have bent portions inserted into the first and second slots.

Additionally, the first slot is formed in the opposite direction to load of the rotor from the bearing housing. The second slot is formed in the direction opposite to the direction of load and the rotation of the rotor in the bearing housing, and an angle formed between a line in a downward direction from the center of the bearing housing and a line of the second slot from the center of the bearing housing is formed at an acute angle.

In addition, the angle is about 30 degrees to 35 degrees.

Moreover, upward pressure of the air with respect to the rotor is formed near the second slot.

Furthermore, the first top foil is combined with the second top foil inserted into the second slot to be overlapped with the upper portion of the second top foil.

Additionally, the air foil journal bearing further includes a pair of bump foils formed on the inner face of the hollow and the outer face of the top foil.

Moreover, the bump foil is formed in a thin plate shape, and includes a plurality of elastic bumps.

Furthermore, the bump foil includes a lower bump foil and an upper bum foil, which are overlapped with each other.

According to the present invention, differently from the conventional bearing using one top foil, since the air foil journal bearing according to the present invention uses a pair of the top foils, the air foil journal bearing is reduced in length and enhanced in assemblability when the top foils are rolled to be round and are inserted into the first and second slots of the bearing housing. So, the air foil journal bearing according to the present invention can solve the problem of abrasion of the conventional bearing that the top foils protrude forwards and backwards and the impeller rubs.

Additionally, when a pair of the bump foils and a pair of the top foils are assembled in an asymmetric structure, because it serves as the conventional mid foil, the air foil journal bearing according to the present invention can prevent an assembly tolerance generated when the number of components is reduced, and can guarantee stability during operation by restraining the axial protrusion since the foils are reduced in length.

In addition, the air foil journal bearing according to the present invention can enhance stability at the time of high speed rotation since upward pressure of air relative to the rotor is formed at the portion where a pressure field starts from the rotating rotor.

BRIEF DESCRIPTION OF THE DRAWINGS

The above and other objects, features and advantages of the present invention will be apparent from the following detailed description of the preferred embodiments of the invention in conjunction with the accompanying drawings, in which:

FIGS. 5A and 5B are perspective views showing a top foil applied to the air foil journal bearing according to the present invention, wherein FIG. 5A illustrates a top foil applied to the conventional bearing, and FIG. 5B illustrates a pair of top foils (300) applied to the present invention;

DETAILED DESCRIPTION OF THE PREFERRED EMBODIMENT

Hereinafter, exemplary embodiments of the present invention will be described in detail in order to sufficiently understand the present invention. The exemplary embodiments of the present invention may be modified in various forms and it should not be construed that the scope of the present invention is limited to the exemplary embodiments described below. The exemplary embodiments are provided to explain the present invention more completely understandable to those skilled in the art. In the following description, the same elements will be designated by the same reference numerals although they are shown in different drawings. Further, a detailed description of a known function or configuration that may make the scope of the present invention unnecessarily ambiguous will be omitted.

Figure 4:
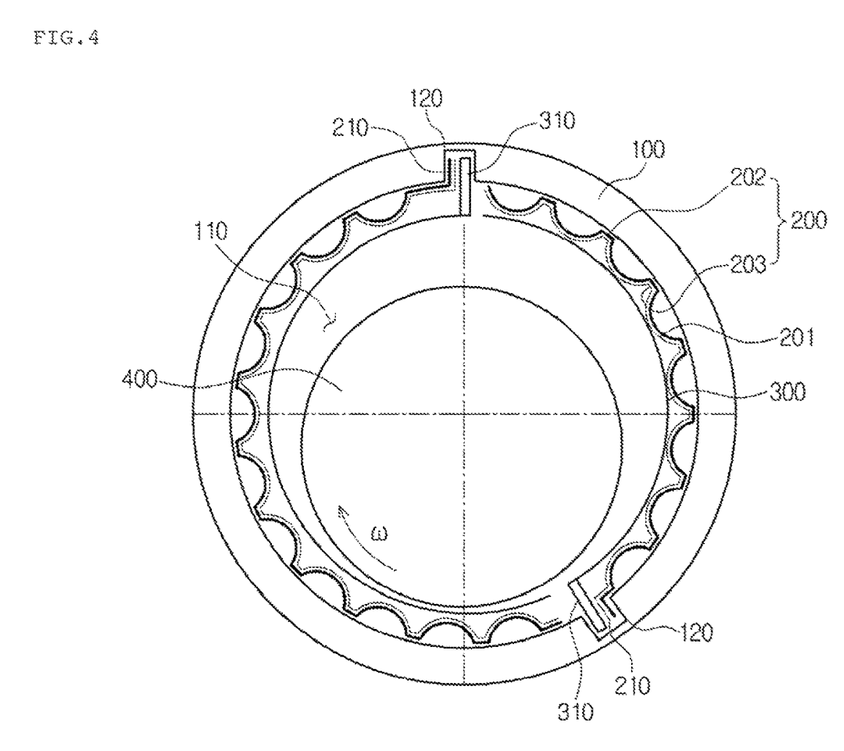
FIG. 4 is a sectional view showing an air foil journal bearing according to the present invention.

FIG. 4 is a sectional view showing an air foil journal bearing according to the present invention.

As shown in FIG. 4, the air foil journal bearing according to the present invention includes: a bearing housing 100 having a hollow 110 in which a rotor is arranged, wherein both width direction sides are formed to be opened; a pair of bump foils 200 with different lengths disposed inside the bearing housing 100 in a circumferential direction, wherein one side is combined and fixed with the bearing housing 100; and a pair of top foils 300 with different lengths disposed inside the bump foil 200 in a circumferential direction, wherein one side is combined and fixed with the bearing housing 100.

The bump foils 200 and the top foils 300 are arranged inside the hollow of the bearing housing 100 in a rolled state, and the top foils 300 may be arranged inside the bump foils 200. Moreover, a rotor 400 may be inserted and arranged inside the top foil 300. In this instance, a rotary shaft part of the rotor 400 may be arranged inside the top foil 300.

Furthermore, the bump foil 200 gets in contact with the inner circumferential surface of the hollow 110 of the bearing housing 100 and is arranged in the circumferential direction. In this instance, the bump foil 200 is formed in a thin plate shape and includes a lower bump foil 202 and an upper bump foil 203. Additionally, the bump foil 200 further includes a plurality of elastic bumps 201 protruding inwardly. In the same manner, the top foils are formed in a thin plate shape and come into contact with the elastic bumps 201.

The bearing housing 100 includes a pair of slots 120 formed by being cut in the bearing housing 100. That is, the slots 120 communicate with the hollow 110 and are formed by being cut in the bearing housing 100 in the width direction. In this instance, the bump foil 200 includes a bent portion 210 formed by a circumferential end portion bent outwardly in a radial direction, and the bent portion 210 is formed to be inserted and arranged into the slot 120. In addition, also the top foil 300 includes a bent portion 310 formed by a circumferential end portion bent outwardly in a radial direction, and the bent portion 310 of the top foil 300 is formed to be inserted and arranged into the slot 120. So, the bent portion 210 of the bump foil 200 and the bent portion 310 of the top foil 300 are inserted and combined into the slot 120 of the housing 100, so that the bump foil 200 and the top foil 300 are fixed to the bearing housing 100. Moreover, the bump foil 200 and the top foil 300 may be combined and fixed with the bearing housing 100 by welding, and may be combined and fixed by one of various methods. Furthermore, the bent portion 310 may be formed at an obtuse angle which is more than 90 degrees from the top foil 300. Here, the bent portion 310 serves as a key to fix the top foil 300 to the slot 120.

Figure 5A:
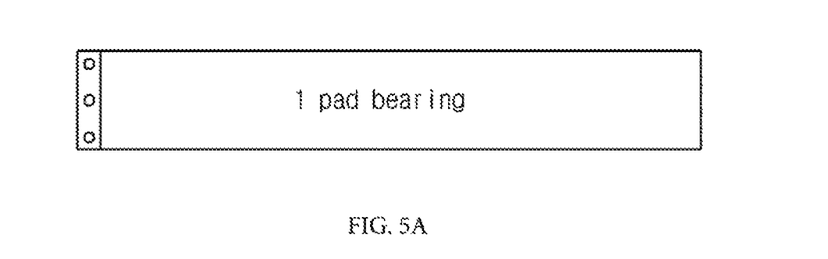
Figure 5B:
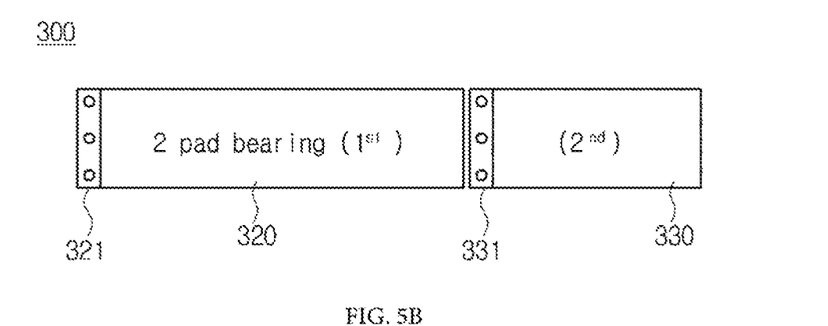

FIGS. 5A and 5B are perspective views showing a top foil applied to the air foil journal bearing according to the present invention, wherein FIG. 5A illustrates a top foil applied to the conventional bearing, and FIG. 5B illustrates a pair of top foils (300) applied to the present invention.

As shown in FIG. 5A, the conventional bearing uses one top foil or three top foils as described in the background art. However, as shown in FIG. 5B, a pair of the top foils 300 have different lengths, and in more detail, include a first top foil 320 which is relatively longer, and a second top foil 330 which is relatively shorter.

In this instance, the first top foil 320 and the second top foil 330 respectively have bent portions 321 and 331 of which end portions are inserted and fixed into the slots 120 formed in the bearing housing 100.

Figure 6:
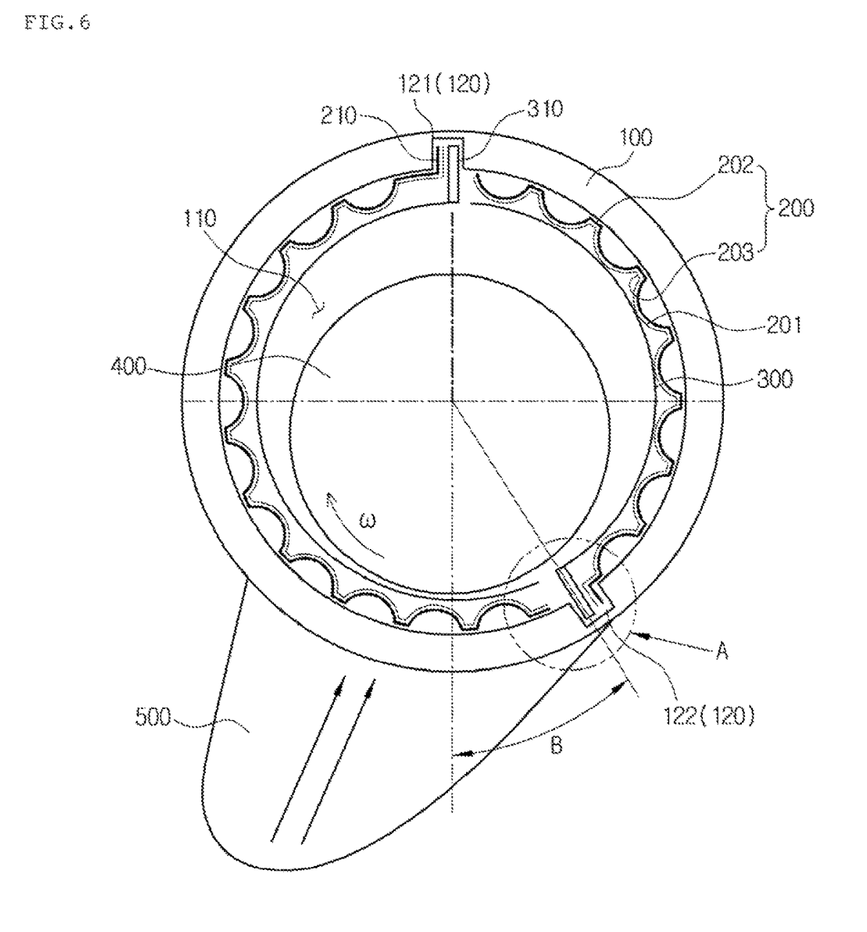
FIG. 6 is a sectional view showing pressure distribution of air acting to a rotor when the air foil journal bearing according to the present invention and the rotor are rotate.

FIG. 6 is a sectional view showing pressure distribution of air acting to a rotor when the air foil journal bearing according to the present invention and the rotor are rotate.

As shown in FIG. 6, when the rotor 400 rotates in the clockwise direction inside the bearing housing 100, a pressure field 500 applied to the rotor is formed, and a portion that such a pressure field 500 starts is formed in a direction that load acts vertically and in the direction opposite to the rotation of the rotor 400. That is, the starting portion of the pressure field is formed in the direction of 5 o'clock of the bearing housing 100 in FIG. 6.

In this instance, the bearing housing 100 includes a first slot 121 formed in the direction of 12 o'clock in FIG. 6, which is the opposite direction of load, and a second slot 122 formed in the direction of 5 o'clock which is the starting portion of the pressure field 500.

Therefore, a pair of the first and second slots 121 and 122 are formed at different positions of the bearing housing 100, and the top foils 300 inserted into the first and second slots 121 and 122 have different lengths.

That is, differently from the conventional bearing using one top foil, since the air foil journal bearing according to the present invention uses a pair of the top foils 300, the air foil journal bearing is reduced in length and enhanced in assemblability when the top foils 300 are rolled to be round and are inserted into the first and second slots 121 and 122 of the bearing housing 100. So, the air foil journal bearing according to the present invention can solve the problem of abrasion of the conventional bearing that the top foils protrude forwards and backwards and the impeller rubs.

In this instance, an angle (B) formed between a line in a downward direction from the center of the bearing housing 100 and a line of the second slot 122 from the center of the bearing housing 100 may be formed in various ways according to rotational speed and material of the rotor 400. The angle (B) is an acute angle.

Preferably, the angle (B) is formed at an angle of 30 degrees to 35 degrees within a range of the rotational speed of the general air foil journal bearing, about 10,000 rpm to 200,000 rpm, in consideration of the high speed rotation of the rotor 400.

Figure 7:
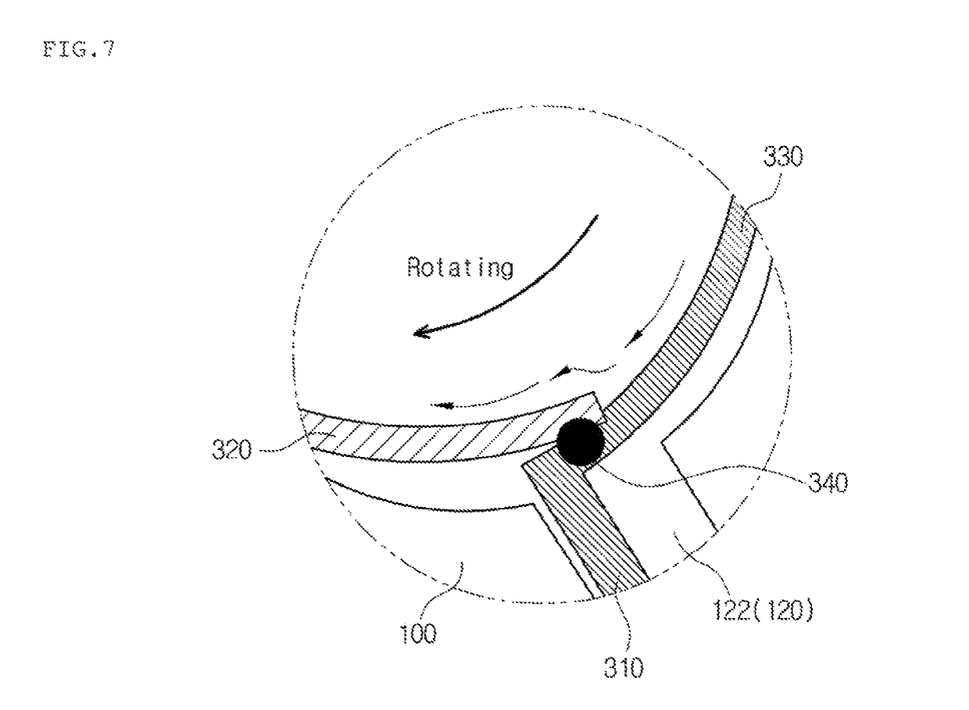
FIG. 7 is an enlarged perspective view of an "A" part having a second slot (122) in FIG. 6.
Figure 8:
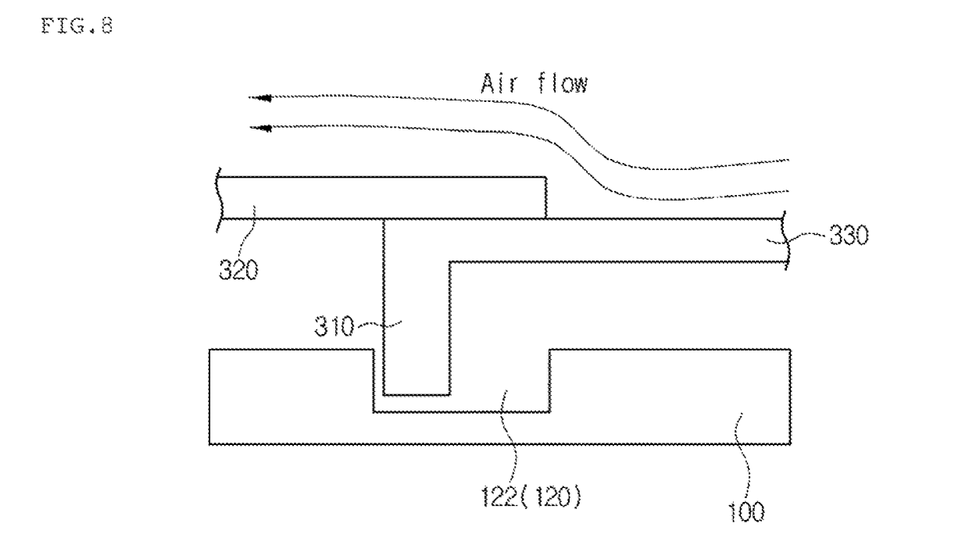
FIG. 8 is a perspective view showing the top foils according to an angle of a bearing housing when the rotor rotates in FIG. 7.

FIG. 7 is an enlarged perspective view of an "A" part having a second slot (122) in FIG. 6, and FIG. 8 is a perspective view showing the top foils according to an angle of a bearing housing when the rotor rotates in FIG. 7. Meanwhile, for your understanding, FIGS. 7 and 8 do not illustrate the bump foil 200.

As shown in FIGS. 7 and 8, the bent portion 310 of the second top foil 330 is inserted into the second slot 122 formed near the 5 o'clock direction of the bearing housing 100, and an end portion of the first top foil 320 is combined with the upper side of the second top foil 330 in the second slot 122 to be overlapped with each other. In this instance, the combination of the first top foil 320 and the second top foil 330 forms a combined surface 340 like a welded surface by welding.

Therefore, an air flow at the second slot 122 where the pressure field 500 starts from the rotor 400 rotating in the clockwise direction directs upwards from the end portion of the first top foil 320 so as to enhance stability at the time of high speed rotation of the rotor 400.

That the second slot 122 is formed in the direction of 5 o'clock of the bearing housing 100 means the direction of 5 o'clock in the clockwise direction when the upper portion is the direction of 0 o'clock. Moreover, in another terms, if the upper portion is zero degree, the lower portion may be 180 degrees. That is, the slots 120 are spaced apart from each other at 160 degrees and 200 degrees and are formed in the bearing housing 100.

Alternatively, not in the fashion that the end portion of the first top foil 320 is combined with the second top foil 330 so that upward pressure of the air with respect to the rotor 400 can be formed at the portion that the pressure field 500 starts from the rotor 500 rotating in the clockwise direction, the upward pressure of the air with respect to the rotor 400 may be formed by transforming the shapes of the first top foil 320 or the second top foil 330 to be bent.

As described above, the air foil journal bearing with the improved housing structure according to the present invention can make the rotor rotate in a state that the rotation center of the rotor coincides with the center of the bearing housing when the rotor rotates, so if it is used to the air compressor, the air foil journal bearing can enhance rotation accuracy of the impeller rotating with the rotor by being combined with one side of the rotor and enhance efficiency and performance of an air compressor.

Particularly, the air foil journal bearing according to the present invention may be properly applied to an air compressor for a fuel cell vehicle because being capable of securing dynamical stability of a rotor of a high speed rotation device.

Additionally, differently from the conventional bearing using one top foil, the air foil journal bearing according to the present invention uses the two top foils, which substitutes with a conventional mid foil by increasing damping of the bearing through independent movements between the two top foils. So, the air foil journal bearing according to the present invention can adjust the position of the slots, which the bent portions of the top foils are inserted, to help formation of internal dynamic pressure of the journal bearing, thereby sufficiently showing its performance without the mid foil and substituting with a conventional half core.

In addition, in order to enhance dynamical stability relative to the high speed rotor with respect to an axial movement by reducing the radial length of the top foils 300, when a pair of the bump foils 200 and a pair of the top foils 300 are assembled in an asymmetric structure, it serves as the conventional mid foil. Therefore, the air foil journal bearing according to the present invention can prevent an assembly tolerance generated when the number of components is reduced, and can guarantee stability during operation by restraining the axial protrusion since the foils are reduced in length.

The exemplary embodiment of the air foil journal bearing of the present invention explained above is illustrative only and a skilled person in the art to which the present invention pertains could understand well that various modifications and other equivalent exemplary embodiments may be made. Therefore, it will be understood that the present invention is not limited only to exemplary embodiments described in the specification of the invention. Therefore, the true technical scope of the present invention should be defined according to the technical spirit of the appended claims. Also, it should be construed that the present invention covers all the modifications, equivalents, and substitutions included within the scope of the present invention defined by the appended claims.

What is claimed is:

1. An air foil journal bearing comprising:
a pair of top foils formed inside a hollow of a bearing housing in which a rotor is arranged,
wherein the bearing housing includes a pair of slots to which end portions of the top foils are inserted,
wherein the slots are a first slot and a second slot,
wherein the first slot is formed in an opposite direction to load of the rotor from the bearing housing,
wherein the second slot is formed in the direction opposite to the direction of load and the rotation of the rotor in the bearing housing, and an angle (B) formed between a line in a downward direction from the center of the bearing housing and a line of the second slot from the center of the bearing housing is formed at an acute angle, and
wherein the pair of the top foils have different lengths.

2. The air foil journal bearing according to claim 1, wherein the top foils are a first top foil and a second top foil, which is shorter than the first top foil.

3. The air foil journal bearing according to claim 2, wherein the first top foil and the second top foil respectively have bent portions inserted into the first and second slots.

4. The air foil journal bearing according to claim 1, wherein the angle (B) is about 30 degrees to 35 degrees.

5. The air foil journal bearing according to claim 1, wherein upward pressure of the air with respect to the rotor is formed near the second slot.

6. The air foil journal bearing according to claim 5, wherein the first top foil is combined with the second top foil inserted into the second slot to be overlapped with the upper portion of the second top foil.

7. The air foil journal bearing according to claim 1, further comprising:
a pair of bump foils formed on the inner face of the hollow and the outer face of each top foil.

8. The air foil journal bearing according to claim 7, wherein each bump foil is formed in a thin plate shape, and includes a plurality of elastic bumps.

9. The air foil journal bearing according to claim 8, wherein the bump foils include a lower bump foil and an upper bump foil, which are overlapped with each other.

* * * * *